United States Patent [19]
Burke

[11] Patent Number: 5,992,787
[45] Date of Patent: Nov. 30, 1999

[54] CORD REEL AND STORAGE DEVICE

[76] Inventor: Donald D. Burke, 9719 N. Flora, Kansas City, Mo. 64155

[21] Appl. No.: 08/796,151

[22] Filed: Feb. 6, 1997

[51] Int. Cl.[6] .................................................. B65H 75/38
[52] U.S. Cl. .................. 242/388.1; 242/398; 242/405.1; 206/409
[58] Field of Search ................................ 242/388.1, 388, 242/388.5, 388.6, 398, 405.1, 129; 254/134.3; 206/702, 409

[56] References Cited

U.S. PATENT DOCUMENTS

| | | |
|---|---|---|
| D. 248,010 | 5/1978 | McKinnon et al. . |
| D. 314,910 | 2/1991 | Van Skiver . |
| 1,609,309 | 12/1926 | Renz ....................................... 242/388.1 |
| 1,692,517 | 11/1928 | Replogle . |
| 1,983,565 | 12/1934 | Replogle ............................... 242/388.1 |
| 2,029,975 | 2/1936 | Winchester ............................ 242/129 |
| 2,364,262 | 12/1944 | Wehringer ............................. 242/388 |
| 2,533,495 | 12/1950 | Moffett .................................. 242/129 |
| 2,576,335 | 11/1951 | Fanslow ................................ 242/388 |
| 2,603,429 | 7/1952 | Jaworowski et al. . |
| 2,824,709 | 2/1958 | Macy ..................................... 242/129 |
| 2,952,420 | 9/1960 | Von Hoorn ........................... 242/388.1 |
| 3,208,121 | 9/1965 | Price ..................................... 242/388.1 |
| 3,355,123 | 11/1967 | Schinske . |
| 3,388,876 | 6/1968 | Wilson . |
| 3,430,886 | 3/1969 | Sweeney . |
| 3,533,599 | 10/1970 | Hindenburg . |
| 3,648,949 | 3/1972 | Berger et al. . |
| 3,782,654 | 1/1974 | Kasa ...................................... 242/388.1 |
| 3,809,331 | 5/1974 | Gaul ...................................... 242/388.1 |
| 3,840,713 | 10/1974 | Carpentier . |
| 3,907,236 | 9/1975 | Sims, Jr. . |
| 3,959,608 | 5/1976 | Finlayson et al. . |
| 4,150,798 | 4/1979 | Aragon . |
| 4,177,961 | 12/1979 | Gruenewald . |
| 4,193,563 | 3/1980 | Vitale ................................ 242/388.5 X |
| 4,261,529 | 4/1981 | Sandberg et al. . |
| 4,390,142 | 6/1983 | Cheng ................................... 242/388.1 |
| 4,489,902 | 12/1984 | Chaconas et al. .................... 242/388.1 |
| 4,586,675 | 5/1986 | Brown . |
| 4,685,636 | 8/1987 | Eaton ...................................... 242/129 |
| 4,778,125 | 10/1988 | Hu . |
| 4,872,622 | 10/1989 | Mansfield .............................. 242/405.1 |
| 4,917,323 | 4/1990 | Wing ...................................... 242/405.1 |
| 4,974,789 | 12/1990 | Milburn ............................... 242/129 X |
| 5,129,514 | 7/1992 | Lilley, Jr. . |

FOREIGN PATENT DOCUMENTS

| | | | |
|---|---|---|---|
| 391188 | 4/1933 | United Kingdom ................ 242/388.1 |
| 2145393 | 3/1985 | United Kingdom ................ 242/405.1 |
| 2237003 | 4/1991 | United Kingdom ................ 242/405.1 |

*Primary Examiner*—Donald P. Walsh
*Assistant Examiner*—William A. Rivera
*Attorney, Agent, or Firm*—Richard P. Stitt

[57] ABSTRACT

A cord storage device is provided which allows the simultaneous winding and unwinding of both halves of a cord while maintaining both cord ends in position for use and the device also permits unwinding of the cord from the storage device while one cord end is held in a fixed position.

23 Claims, 12 Drawing Sheets

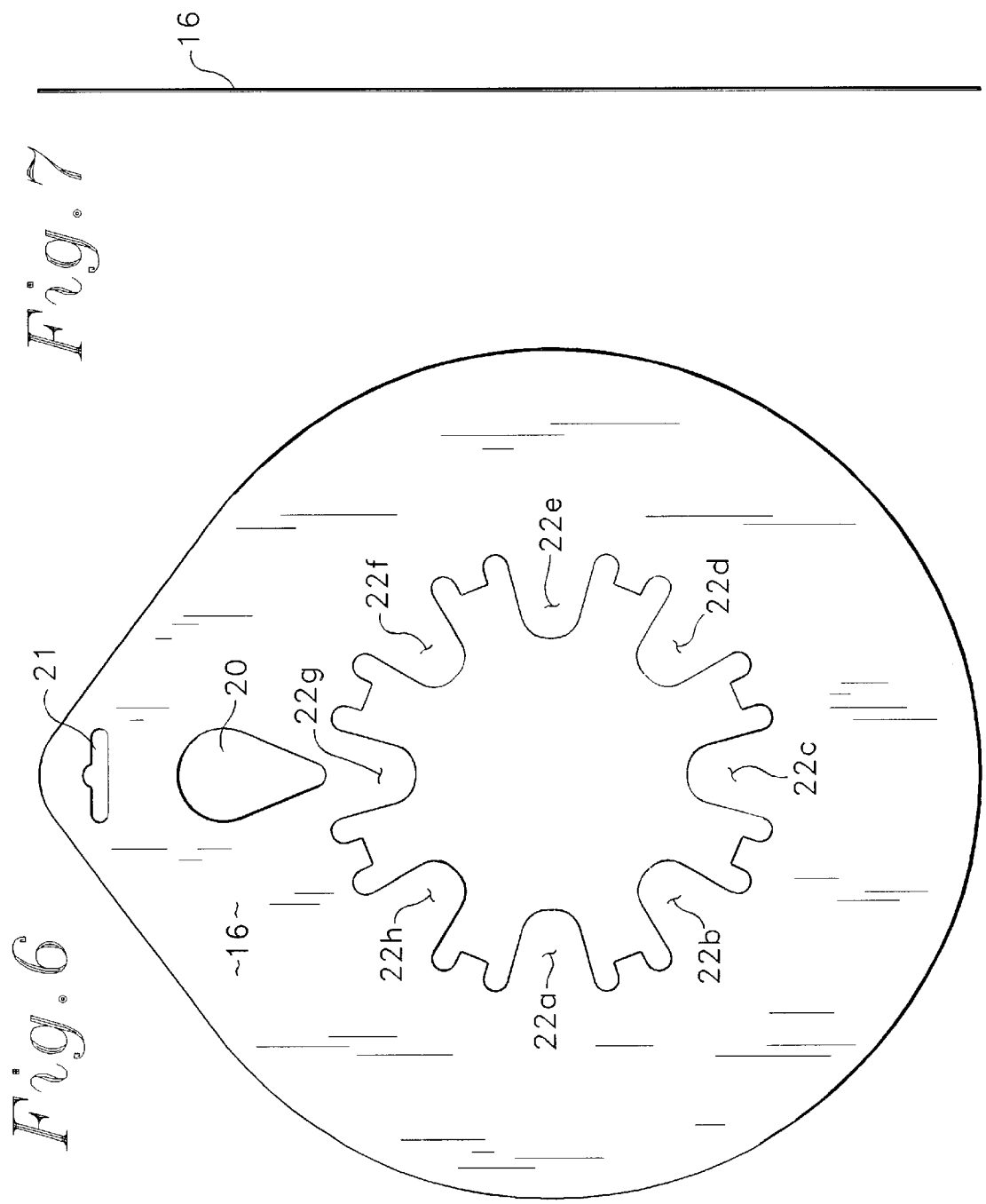

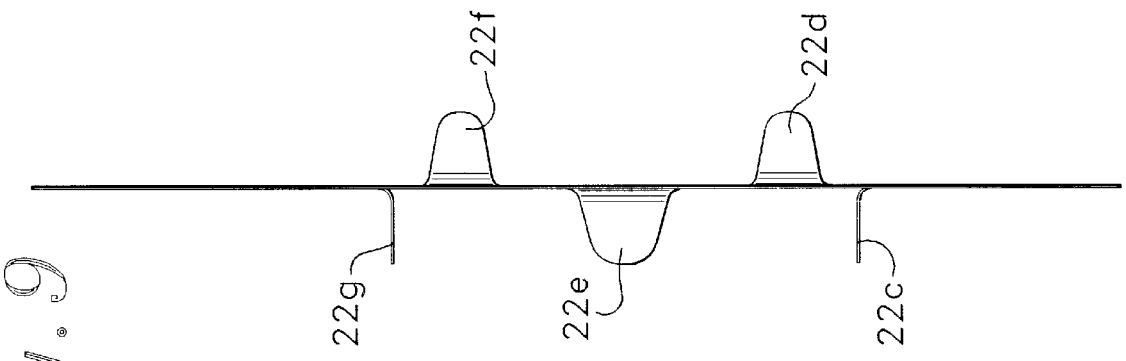
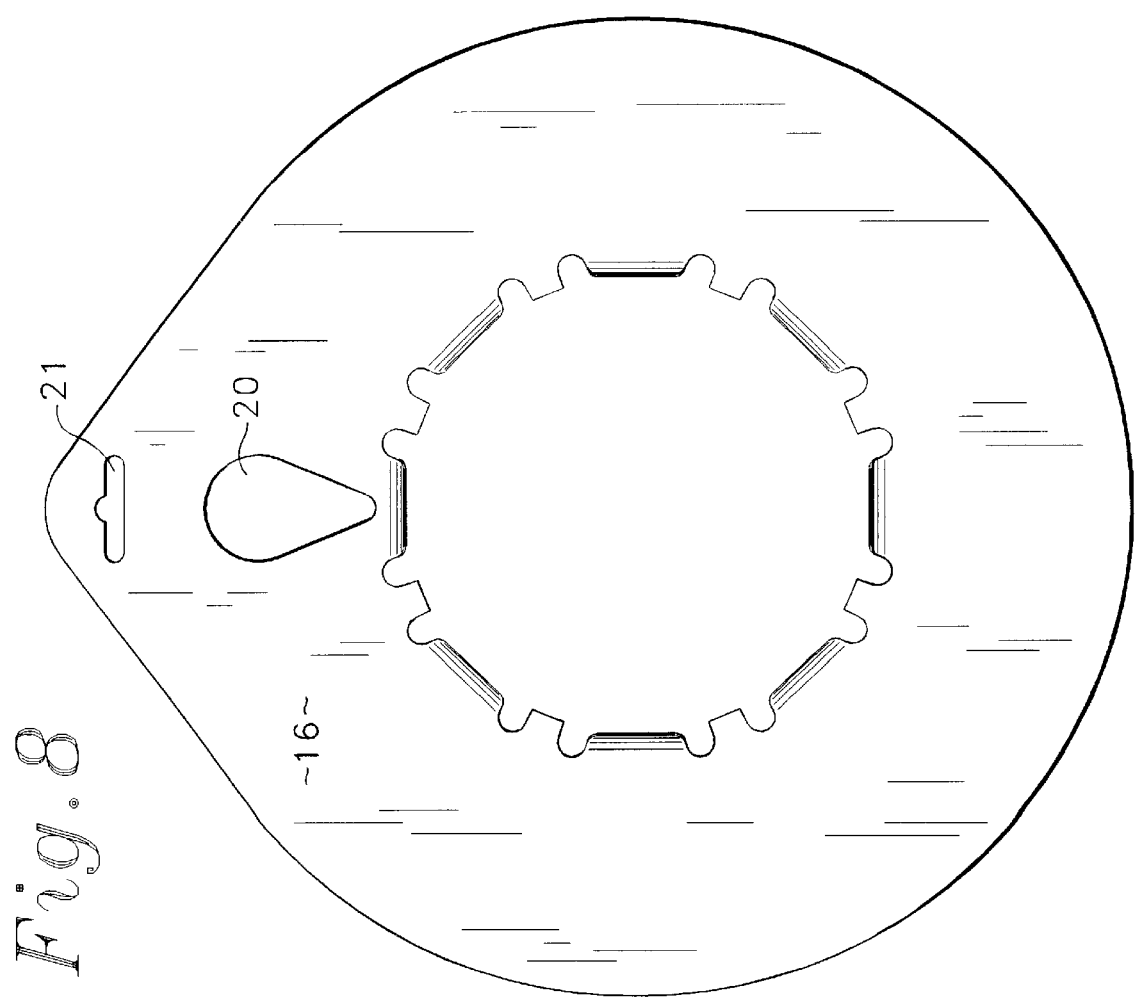

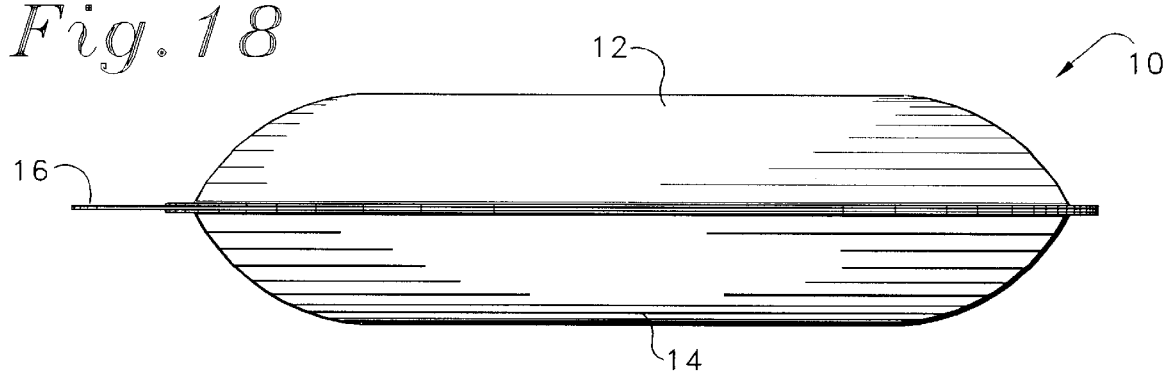
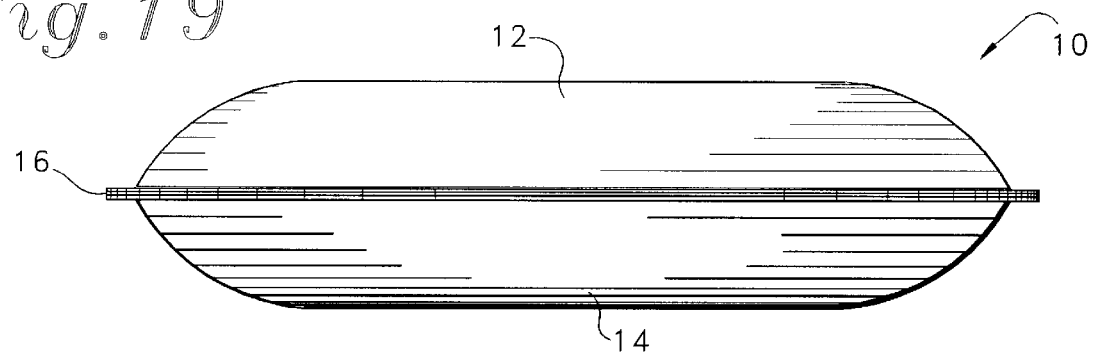
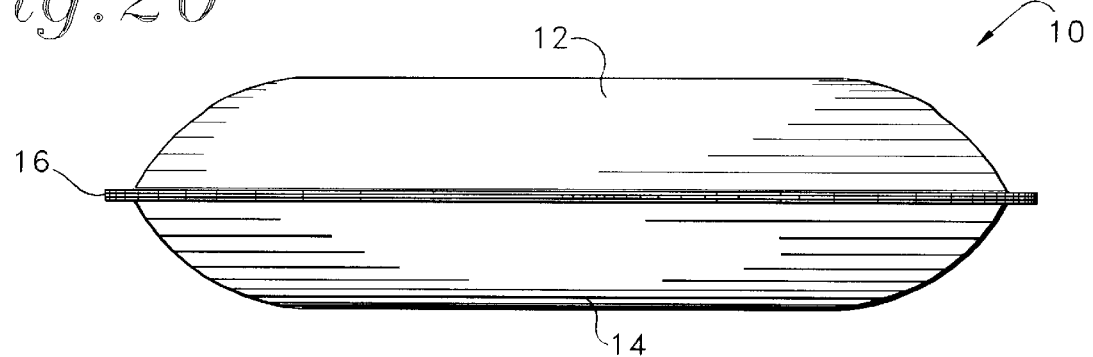

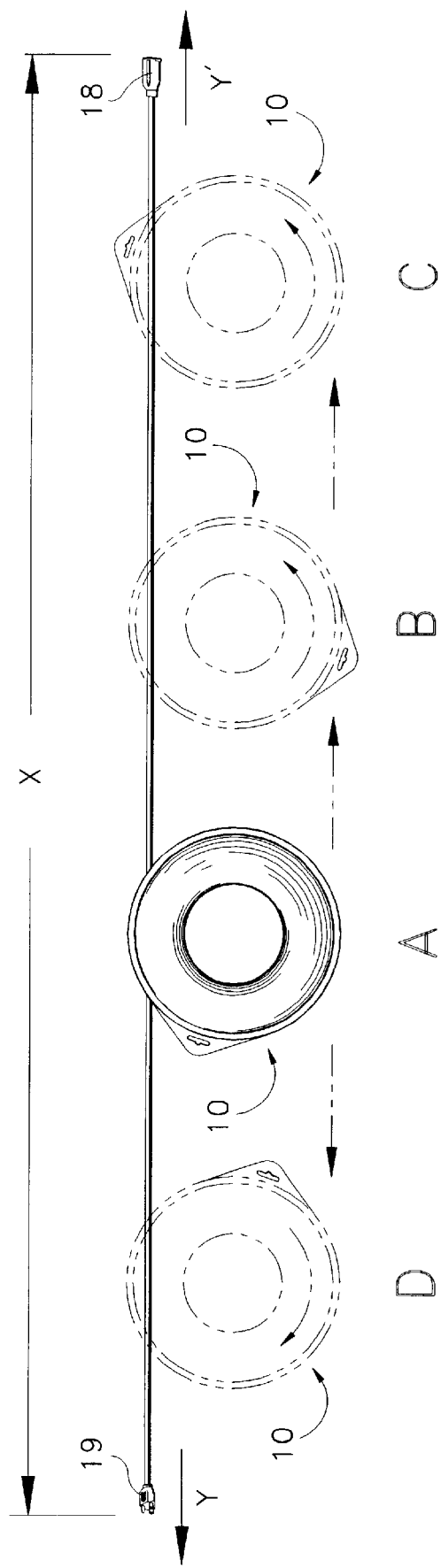

CORD REEL AND STORAGE DEVICE

BACKGROUND OF THE INVENTION

This invention relates to devices for storing cords such as electrical extension cords or appliance cords. Particularly, this invention relates to a device for maintaining such cords in a compact, untangled manner and for providing both cord halves and ends available and ready for instant and individual or simultaneous extension and use.

The convenient storage and use of electrical extension cords, electrical cords, and other such lines and cords is a continuing problem. With extension cords in particular it is desirable, if not required, to access both ends of the cord during use. Previous holders for such cords solve this problem, generally, by one of two methods: first, the fixing of one end of the cord to the exterior of a cord holder device while the remainder of the cord is wound on the device; or second, the fixing of the middle of the cord on a holder device and winding, simultaneously, both ends of the cord onto the holder.

In the first method, the utility of the cord is limited as one end of the cord is fixed to the holder and can not be conveniently moved. Where the male end of the cord is attached to the holder, the holder becomes an additional impediment to connecting male end of the cord to a partially blocked or distant outlet. Alternatively, where the female end of the cord is attached to the holder, the holder becomes an albatross to which the cord of the electric appliance is anchored.

In the second method, the winding and free uncontrolled unwinding of the cord from the device results in tangling of the cord with itself on the device. The result is a cord which becomes knotted with itself on the device. This requires repeated untangling of the cord during subsequent unwinding. In addition, such devices tend to be bulky and inconvenient to carry on the job and to transport. Examples of various types of cord storage devices may be found in issued patents.

Examples of devices which simply wind a cord about an elongate axis are Sims, Jr., U.S. Pat. No. 3,907,236; Gruenewald, U.S. Pat. No. 4,177,961; Sandberg et al., U.S. Pat. No. 4,261,529; Brown, U.S. Pat. No. 4,586,675; Hu, U.S. Pat. No. 4,778,125; and Lilley, Jr., U.S. Pat. No. 5,129,514. These patents teach devices for winding a cord around an unenclosed device having an elongate axis. However, none of these patents teach or suggest the separation of a cord into cord-portions for storage in separate storage compartments to make available both cord ends for use and to allow both independent and simultaneous winding and unwinding of the cord-portions. In all of these patents one cord end is fixed to the housing and therefore they teach against making both cord ends available to the user.

Examples of patented devices which teach the winding of a cord onto a central hub and which is, generally, not enclosed are Jaworowski et al., U.S. Pat. No. 2,603,429; Schinske, U.S. Pat. No. 3,355,123; Wilson, U.S. Pat. No. 3,388,876; Hindenburg, U.S. Pat. No. 3,533,599; and Van Skiver, U.S. Pat. No. Des. 314,910. These patents, except VanSkiver, teach the winding of a cord from one end to the other end about a drum or central hub thereby presenting only one end of the cord for use. None of these patents teach separation of cord-portions into different storage compartments to present both cord ends for individual or simultaneous use.

The VanSkiver reference varies from the above teaching in that it appears to present a hook attached to the single storage area about the central hub. This hook may be used to secure on end of a cord or may allow for the attachment of a mid-section of a cord near the hub. This would allow the formed cord halves to be wound onto the device to present both ends of the cord for use. However, VanSkiver does not divide the cord into separated storage compartments to permit separated storage and individual winding and unwinding of either cord end for use. It is the unseparated storage of VanSkiver which causes the problem of entanglement between the cord-portions as they are wound on and off the device. This type of storage requires the user to frequently stop unwinding and manually separate the tangled cord. The present invention solves this problem and presents both cord ends for both independent and simultaneous unwinding by the user.

Other cord devices have a central hub for winding a cord thereon with the cord storage area having walls which, to different degrees, enclose the storage area. Examples of patents showing such devices are Sweeney, U.S. Pat. No. 3,430,886; Berger et al., U.S. Pat. No. 3,648,949; Carpentier, U.S. Pat. No. 3,840,713; Finlayson et al., U.S. Pat. No. 3,959,608; McKinnon et al., U.S. Pat. No. Des. 248,010; Eaton, U.S. Pat. No. 4,685,636; and Mansfield, U.S. Pat. No. 4,872,622. None of these references teach or suggest separation of a cord into cord-portions for separated storage to provide both cord ends for use and to allow both independent and simultaneous winding and unwinding of the cord-portions. In all of these references, except Eaton, one cord end is either fixed to the housing or is wound against the hub and, therefore, they teach against making both cord ends available to the user. In Eaton, two wire ends protrude from the device as a result of a specific method for loading wire onto the reel and the specific manner of making wire harnesses taught by Eaton.

The patent to Mansfield teaches a device for winding a cord thereon for later opening of the device to allow removal of the cord as a wound unit. Though the cord may be used while on the Mansfield device, one cord end is fixed at (23) to the inside central opening (17) of the mansfield device. Mansfield teaches against the present invention in that it fixes one cord end to the device thereby preventing unwinding of that end from the device. Mansfield further teaches against the present invention as the Mansfield device is intended to provide, and teaches, the use of a single compartment so that the wound cord may be removed from the device as a bundle upon taking the device apart. The Mansfield device is open to entry of dirt and moisture and is intended to be disassembled for removal of the cord as a whole.

Finally, designers of cord reel and storage devices have added moving parts which are intricate and must be precision manufactured and contain various bearing surfaces to permit smooth operation. Examples of such devices can be found in the patents to Replogle, U.S. Pat. No. 1,692,517; Replogle, U.S. Pat. No. 1,983,565; Von Voorn, U.S. Pat. No. 2,952,420; Kasa, U.S. Pat. No. 3,782,654; Gaul, U.S. Pat. No. 3,809,331; Aragon, U.S. Pat. No. 4,150,798 and Chaconas et al., U.S. Pat. No. 4,489,902.

The devices of these patents are cord storage devices having either two housing portions which must rotate against each other, or an internal rotating divider, or both. The storage compartment of these devices is split into two cord storage areas with the cord passing into both areas for storage. None of these patents teach or suggest a device which eliminates the use of moving parts and bearing surfaces and winding handles while achieving separation of a cord into two cord-portions to present both cord ends for use and to allow both independent and simultaneous winding and unwinding of the cord-portions.

The present invention eliminates these moving parts while accomplishing the above-stated benefits. All of the devices in the last-above group require intricate and precision molded part construction and complicated assembly by the manufacturer or user thus resulting in an expensive product. All of these devices require bearing surfaces due to the rotation of device parts. This presents the opportunity for substantial friction between moving parts and drag on the cord.

All the devices of this group require equal amounts of cord to be simultaneously wound or unwound from the device. None of these devices teach or suggest how a user might have access to either cord-portion independently of the other thereby allowing differential winding and unwinding of the two cord-portions. In fact these references teach against the independent operation of each cord half by making winding and unwinding of the two cord-portions a result of the movement of the same parts of the device. Thus independent utilization of a single cord-portion cannot occur in these devices.

Further, none of the devices of this group are capable of loading a cord or changing cords on the device without complete disassembly of the device. Also, none of the devices of this group allow for complete concealment of the cord and cord ends within the device to exclude dirt and moisture from the cord storage area.

A particular example is U.S. Pat. No. 2,952,420 to Von Hoorn in which a cord is separated within a reel by a divider. Von Hoorn, however, presents several drawbacks which are overcome in the present invention. Specifically, the Von Hoorn device incorporates a housing of two pieces which must rotate against each other to unwind and rewind the cord, and which requires the cord to travel in and out of slots in the housing and it relies on a finger-hold means for the rewinding operation. Thus Von Horn device requires precision casting or molding during manufacture making the device expensive to produce. Importantly, the Von Hoorn device must be disassembled to load a cord into the device as the Von Hoorn device does not have flexible outer wall allowing user access to the storage areas of the device. The Von Hoorn device presents substantial frictional resistance during operation by the rotating bearing surfaces and the cord rubbing against the access slots. Importantly, since the cord in the Von Hoorn device is mounted on a rotating reel, a user must pull on both ends of the cord at once and equal amounts of the cord must be extracted from the holder to avoid binding of the cord within the device. The Von Hoorn device does not allow independent winding and unwinding of the two ends of the cord.

Therefore, a long need has existed for a cord reel and storage device which permits user access to both ends of the cord while permitting removal of either or both ends of the cord from the reel either simultaneously or individually and which can allow one end of the cord to be fixed in place while the cord reel is operated to unwind the cord from storage on the device and which permits the cord and cord ends to be fully captured and concealed within the storage device to protect the cord from dirt and moisture and which allows a user to load a new cord or change-out the old cord without the need to dismantle the device and which prevents the free, uncontrolled unwinding of the cord from the reel and which can accomplish all these benefits while eliminating the need for moving parts and bearing surfaces and precision molded and intricate parts.

SUMMARY OF THE INVENTION

The objectives of the present invention include providing a cord storage device which permits rapid winding and unwinding of the two ends of a cord while avoiding tangling of the cord and while eliminating moving parts.

A principle object of the invention is to provide, within a single cord holding device, the ability for a user to separately and individually wind and unwind either end of a cord with respect to the other end of the cord and a device which also permits a user to simultaneously winding and unwinding of both ends of the cord.

It is another object of the device to provide a cord storage device which allows both ends of the cord to be independently available for use and does not require equal payout to take-up of the cord ends during use.

Yet another object of the present invention to allow unwinding of the cord from the device while one end of the cord is fixed in place.

Another object of the present invention to provide unwinding of both ends of the cord from the device by a user pulling on one cord end while the other cord end is fixed in place.

Another object of the present invention to allow complete concealment of the cord ends within the device for protection of the cord from dirt and dust by providing a generally flexible outer wall for protection of the cord from dirt and dust.

Still another object of the present invention is to provide a cord storage device which allows a user to install a cord into the device without disassembly of the cord storage device by providing a generally flexible outer wall allowing user access to the device interior.

It also is a principle object of the present invention to provide a cord reel and storage device which eliminates the use of internal rotating cord spools and rotating housing pieces and the associated bearings required in prior art cord reels and which avoids the need of a handle or crank for rewinding of the cord within the device.

Another object of the invention is to provide a cord reel and storage device which is low in cost by avoiding the high tooling costs associated with intricate and precision molded parts and with moving parts and the manufacture of various bearing surfaces required in prior art devices having internal moving spools and rotating housings.

Yet another object of the invention is to provide a cord reel and storage device which eliminates the high friction situations between rotating parts of prior art devices.

Still another object of the invention is to provide a cord reel and storage device which applies a clamping action against the cord to prevent the cord from loosening on the reel and falling in loose coils off of the reel and to prevent the wound cord from tangling on the reel.

These objectives and other benefits are achieved by a cord reel and storage device comprising a generally annular-shaped container having a hollow interior and presenting an inner wall and a flexible outer wall having a continuous circumfrential opening in the outer wall of said container to provide access to said container interior and to allow user insertion of the cord upon flexing said outer wall to access said interior and a divider within said interior extending generally from said inner wall and terminating proximate to said circumfrential opening for partitioning said interior into a first container half and a second container half, and a void in said divider to permit cord communication between said first and second halves for windable cord storage about said container inner wall of a first cord-portion in said first half and for windable storage about said container inner wall of a second cord-portion in said second half to accomplish separated cord-portion storage to allow both independent as well as simultaneous winding and unwinding of said first and second cord-portions.

In an alternative embodiment the cord communication is accomplished by routing the cord through holes or voids in each inner wall of each container-half. In this embodiment the foregoing objectives and other benefits are achieved by a cord reel and storage device comprising a generally annular-shaped container having a hollow interior and presenting an inner wall and a flexible outer wall, having a continuous circumfrential opening in the outer wall of said container to provide access to said container interior and to allow user insertion of the cord upon flexing said outer wall to access said interior and a divider within said interior extending generally from said inner wall and terminating proximate to said circumfrential opening for partitioning said interior into a first container half and a second container half, and a first void in said first half inner wall, and a second void in said second half inner wall, said first and second voids permitting passage of the cord between said first and second halves for windable storage about said container inner wall of a first cord-portion within said first half and for windable storage about said container inner wall of a second cord-portion within said second half to accomplish separated cord-portion storage to allow both independent as well as simultaneous winding and unwinding of said first and second cord-portions.

The foregoing and other objects are not meant in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 6 is a plan view of the divider of FIG. 2 showing an embodiment of the pass-through void and the optional centering tabs in flattened position;

FIG. 7 is a side view of the divider of FIG. 6;

FIG. 8 is a plan view of the divider of FIG. 6 with the optional centering tabs bent to 90° to alternate sides for registration with the shell-halves of the device;

FIG. 9 is a side view of the divider of FIG. 8, showing the alternating positioning of the bending of the centering tabs;

FIG. 18 is a left side elevational view of the device as shown in FIG. 17 and of which the right side elevation is a mirror image thereof, and showing the complete concealment of the cord within the device and the closure of the side walls to exclude dirt and moisture from the interior;

FIG. 19 is a bottom elevational view of the device as shown in FIG. 1;

FIG. 20 is a top view of the device as shown in FIG. 1; and

FIG. 21 shows the device of FIG. 1 with each of the cord-portions wound onto the device in opposite directions in order to prevent further unwinding of cord from the device after a user has selected the amount of cord to be outside of the device and showing in phantom lines the repositioning of the device along the length of the selected amount of cord.

DETAILED DESCRIPTION OF THE PREFERRED EMBODIMENTS

Figure 1:
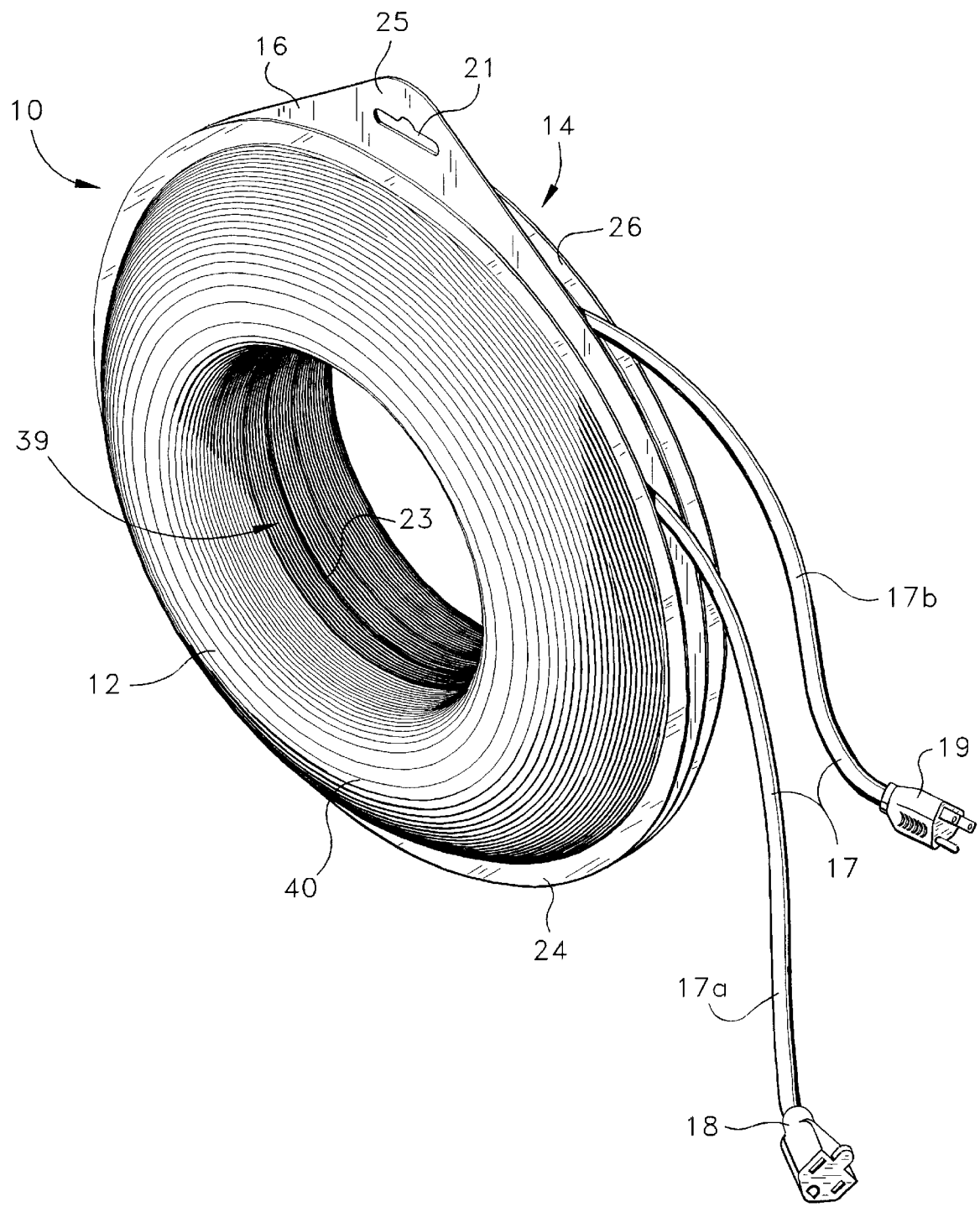
FIG. 1 is a perspective view of the invention showing the ends of an internally mounted electrical cord extending from either of the separated storage sides of the device.

Referring to FIG. 1, a front and right side perspective view of an embodiment of cord reel and storage device 10 is shown. Device 10 is an annular ring comprised of two joined shell-halves 12, 14 which form a hollow annular ring or donut-shaped container into which cord 17 is loaded. Halves 12, 14 are joined at junction 23 which is an inside wall 39 of donut-shaped, or annulus-forming, shell-halves 12, 14. In the embodiment of FIG. 1, cord 17 communicates around or through divider 16 to provide a portion of cord 17 on either side of divider 16. Cord end 18 extends outside of device 10 from a first or front side of divider 16 and cord end 19 extends outside of device 10 from a second or back side of divider 16.

Shell-halves 12, 14, as a joined whole, may be described in practical terms as comprising, generally, a donut-shape with the interior of the donut being hollow to provide a space for holding a cord—in other words the general shape of device 10 is a hollow annulus, or hollow annular ring, or donut shape having a hollow interior space separated by divider 16 into two cord storage portions. Shell-halves 12, 14 can be formed from any material providing sufficient flexibility to permit outer wall 40 of halves 12, 14 and flanges 24, 26 to be flexed away from divider 16 to permit cord passage from the interior storage areas 13, 15 (FIG. 4) to the outside of device 10.

It is also important and useful for shell-halves 12, 14 to have a flexible outer wall 40 which is sufficiently flexible to allow a user to open outer wall 40 and flanges 24, 26 to allow insertion of a user provided cord 17 through pass-through void 20 (FIG. 2) of divider 16. In this manner a user can replace a worn cord or can substitute any cord into device 10 without the need to dismantle device 10 as is the case and problem in prior art devices.

Figure 2:
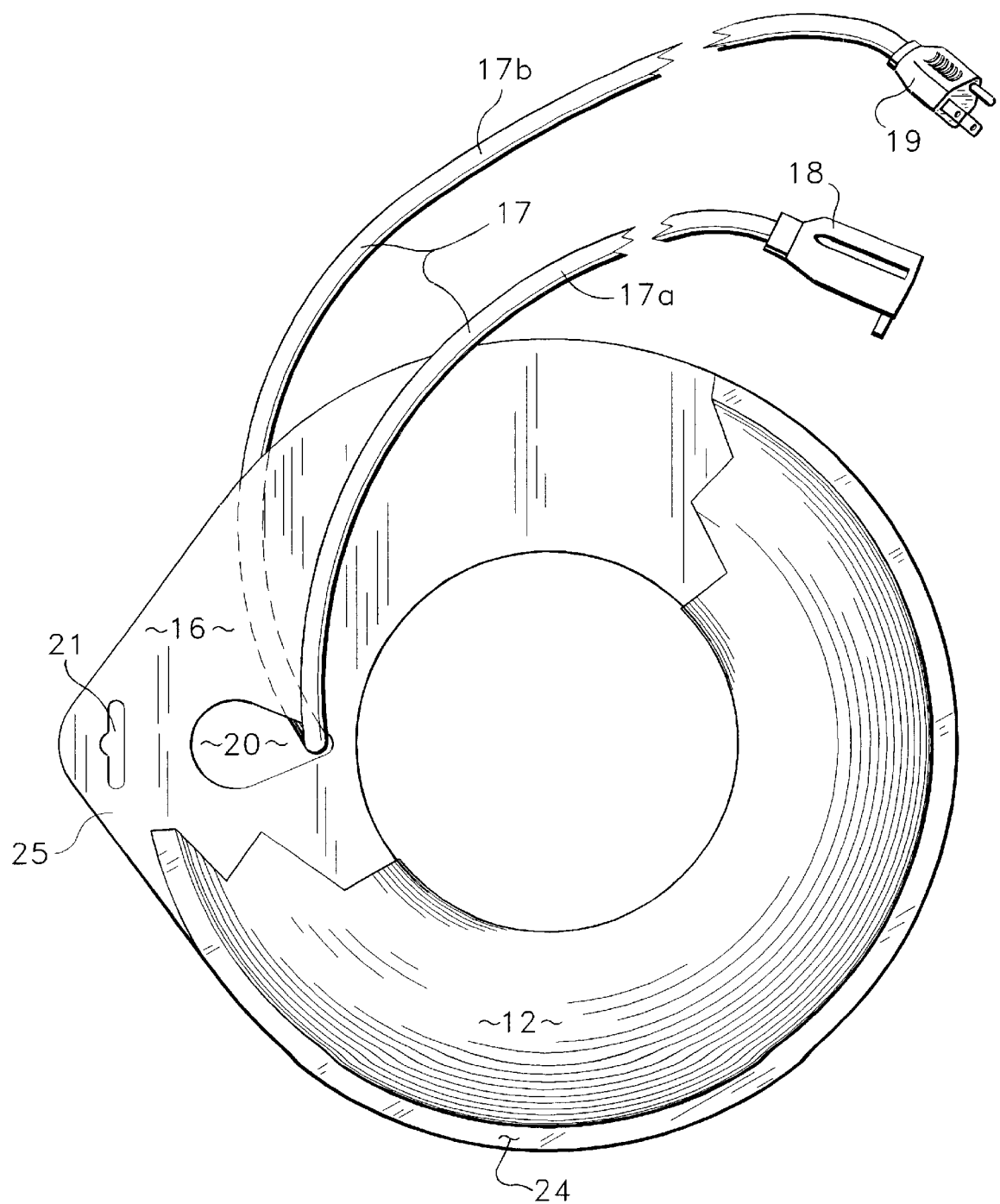
FIG. 2 is a top plan view of the invention having a portion of one side or shell-half broken away to reveal the inner divider and pass-through void for the cord.

FIG. 2 is a plan view of the embodiment of FIG. 1 having a portion of shell-half or container-half 12 removed to reveal divider 16. As stated above, cord end 18 extends outside of device 10 from the front side of divider 16 (FIG. 1) and cord end 19 extends out from the back side of divider 16. This separation of cord 17 into cord portions 17a and 17b is achieved by pass-through void 20 in divider 16 which allows cord 17 to communicate from half 12 to half 14 and permits cord-portion 17a, to be located within hollow space 13 (FIG. 4) of half 12 for storage therein and another portion of cord 17, cord-portion 17b, to be located within hollow space 15 (FIG. 4) of half 14 for storage. It will be appreciated that cord storage areas 13, 15 (FIG. 4) within halves 12, 14 are maintained as generally separate compartments by divider 16. Pass-through void 20 is sufficiently large to permit passage of either of cord ends 18, 19 therethrough to allow cord 17 to be divided among storage areas 13, 15 of halves 12, 14 of the donut-shaped device 10.

Figure 4:
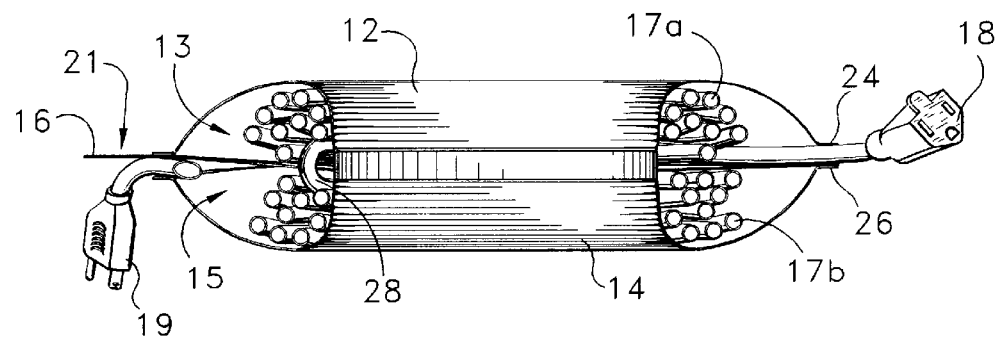
FIG. 4 is a cross-sectional view taken along line 4—4 of FIG. 5 and showing the placement of a cord within the device and the separation of the cord ends by the divider.

To load a cord 17 into device 10 a user flexes outer wall 40 of either shell half 12, 14 away from divider 16 to allow user access to storage area 13, 15. Cord 17 is inserted and pulled through void 20 until approximately half of the length of cord 17 is on either side of divider 16. Once cord 17 is placed through void 20 to distribute a portion of cord 17 to either side of void 20, cord portions 17a, 17b can be simultaneously or individually wound into storage-halves 13, 15 of shell-halves 12, 14. While winding cord 17 into device 10, void 20 serves to anchor cord 17 within device 10 so that cord 17 does not slide around the interior of device 10. Once cord 17 is wound into device 10 it is contained within storage areas or storage-halves 13, 15 (FIG. 4).

It will be appreciated by those skilled in the art that divider 16 serves to maintain cord portions 17a, 17b in separated fashion within storage areas 13, 15. In this manner each cord-half 17a, 17b can be individually wound and unwound while avoiding becoming tangled with the other cord-half. Such tangling of cord halves is a significant and constant problem with reel-type storage devices which merely anchor the midpoint of the cord to the reel for winding of both cord ends thereon. In such devices the two cord halves do not wind and unwind evenly, and during use one cord half frequently becomes inter-twined with the other cord half. During the next unwinding from the holder, the user must cease unwinding and untangle the two cord halves. This problem is eliminated in the present invention while also eliminating the need for moving parts and bearing surfaces and precision manufacturing of parts required in prior art devices. The divider 16 and separate storage compartments 13, 15 of the present invention cause the cord-portions to become untangled during rewinding and thereby condition the cord for the next use.

In FIGS. 1 and 2 divider 16 is shown as co-extensive with flanges 24, 26 of halves 12, 14. However, divider 16 may extend outwardly beyond flanges 24, 26 if desired. Flanges 24 and 26, alternatively, may also extend beyond one or the other or beyond divider 16. In the embodiment of FIGS. 1 and 2, divider 16 is provided with extension section or extension tab 25 which contains hanger aperture 21. Aperture 21 permits hanging of cord holder 10 from a hook for storage. Extension tab 25 provides an extended section of divider 16 which can act as a handle with which to pry open outer walls 40 for access into either compartment 13, 15. It will be appreciated that the extended section could be a tab attached to divider 16. Alternatively, this aspect may be eliminated to provide a divider 16 which terminates co-extensively with the outside edge of flanges 24, 26 of device 10.

Figure 3:
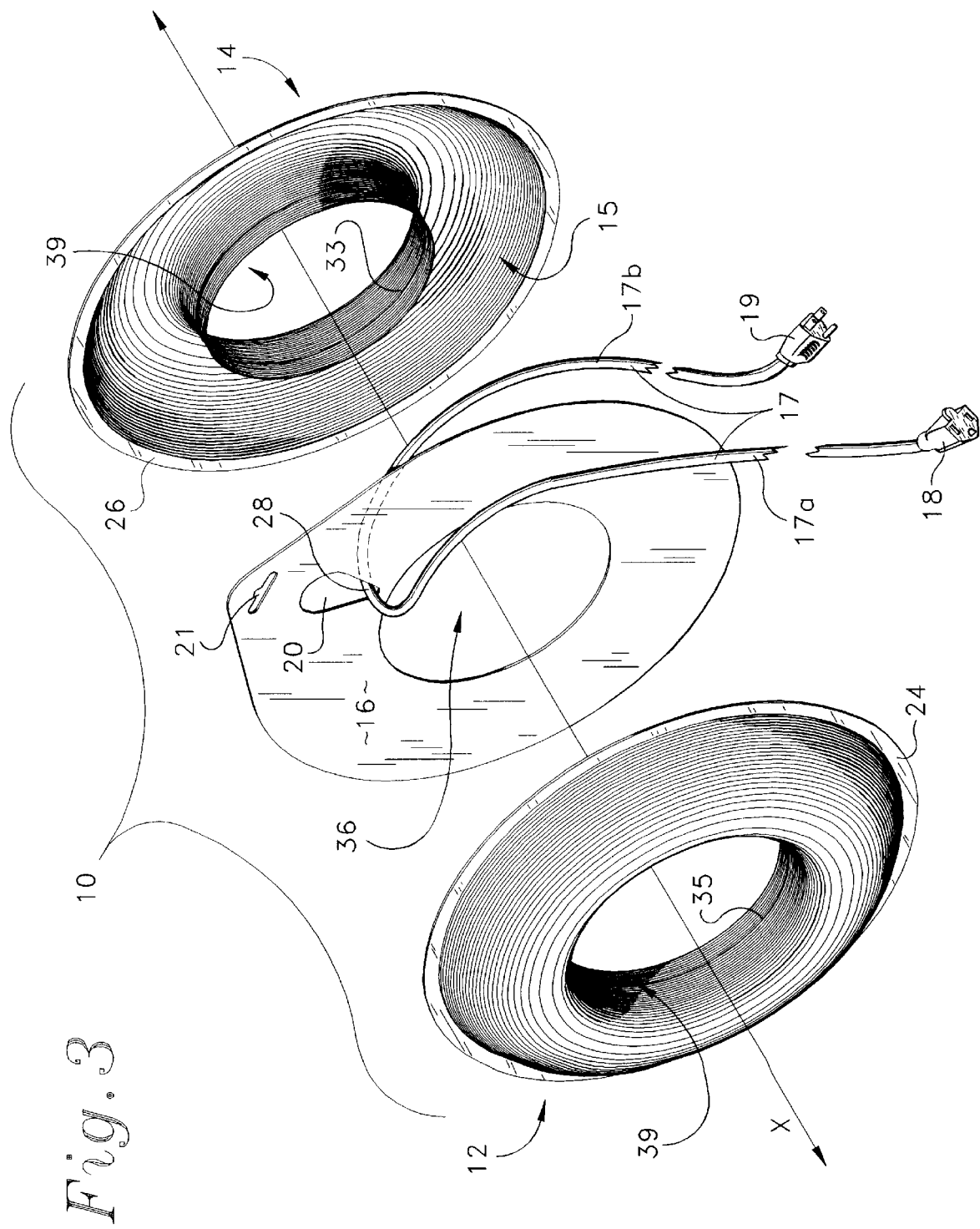
FIG. 3 is an exploded view of the invention of FIG. 1 and showing the two sides or shell-halves and the inner divider and the orientation of a cord therein with a first end of the cord to one side of the divider and a second end of the cord to the second side of the divider.

Referring now to FIG. 3, it can be observed that halves 12, 14 are each one-half of an annular ring or donut shape having a hollow interior. When half 12 is joined with half 14 the whole hollow annular ring is bilaterally bisected or separated by divider 16 to provide two hollow annular halves 12, 14 having an interior storage space 13, 15 (FIG. 4) in which each space 13, 15 is separated from the opposing half space 13, 15 of the annular ring by divider 16. The two annular ring halves 12, 14 are joined at their inner wall or inner donut wall 39 (FIG. 1) at junction 23 (FIG. 1) by the union of inner joint 33 and outer joint 35 (FIG. 3). It will be appreciated that halves 12, 14 of annular ring or donut-shaped device 10 are generally defined by a plane which bisects or bilaterally divides the annular ring or donut shape with the plane being oriented at right angles or orthogonally to an axis X (FIG. 3) which passes through the center of the annulus or annular ring or donut shape. The manner of connecting halves 12, 14 is discussed hereinafter.

Divider 16 in FIG. 3 is shown with cord 17 inserted through void 20 with approximately half of cord 17, or cord portions 17a, 17b, on either side of divider 16. The insertion of cord 17 through divider 16 may be performed prior to assembly of divider 16 with halves 12, 14 or cord 17 may be inserted through void 20 after the assembly of divider 16 between halves 12, 14. As previously described, once half 12 is joined to half 14 with divider 16 in place, cord 17 can be passed through void 20 and cord portions 17a, 17b then wound within storage space 13 of half 12 and storage space 15 of half 14.

The assembly of half 12 to half 14 in the embodiment of FIG. 3 is accomplished by press-fitting inner joint 33 of half 14 into outer joint 35 of half 12 to join halves 12 and 14 at junction 23 (FIG. 1) to thereby provide a central hub or junction 23 upon which divider 16 is mounted with joints 33, 35 passing through central opening 36 of divider 16. Divider 16 may be fixed on junction 23 or may be allowed to slide from side-to-side on junction 23 in order to accommodate differing amounts of cord 17 inside either of halves 12, 14. The benefits of the methods of mounting divider 16 on junction 23 will be discussed hereinafter.

Figure 5:
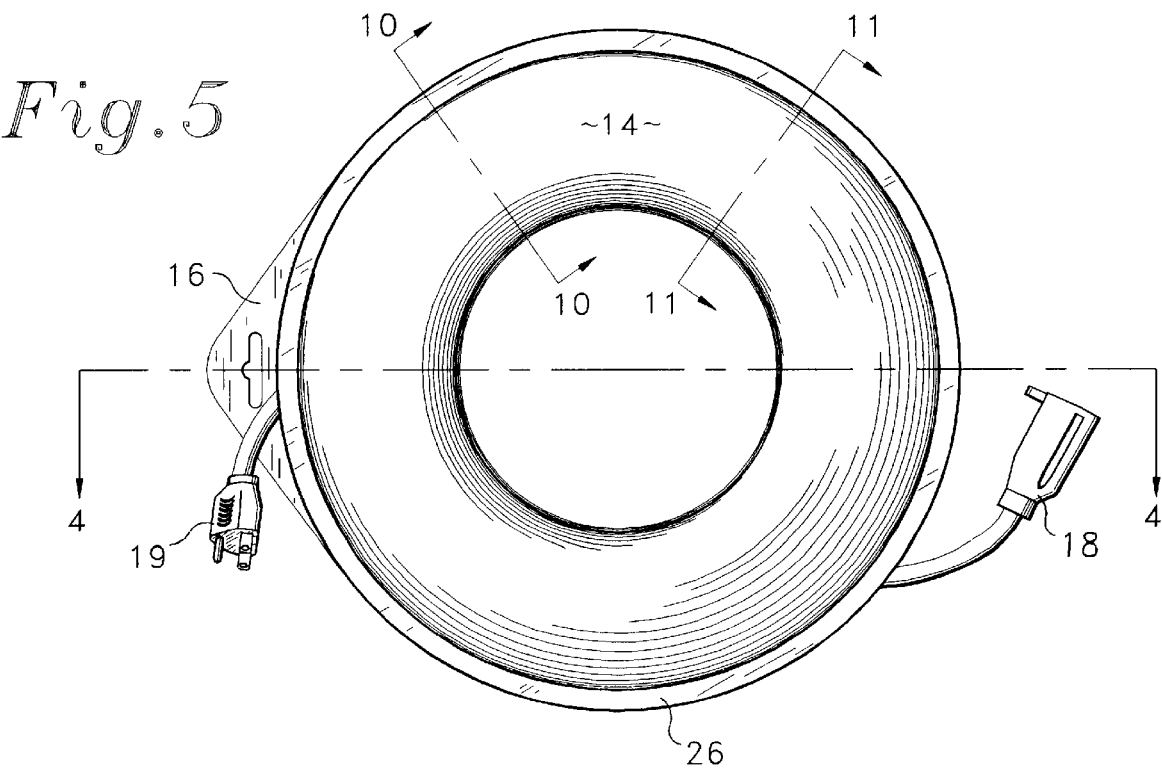
FIG. 5 is a top plan view of the device showing the ends of a cord extending therefrom.

Referring now to FIGS. 4 and 5 the assembled device 10 is shown having cord 17a, 17b wound into storage areas 13, 15 of halves 12, 14. In FIG. 4 a segment 28 of cord 17 is shown passing from storage area 13 and into storage area 15 via void 20 (FIG. 3). In general, segment 28 will be a portion of cord 17 which is nearly equidistant between cord ends 18, 19. This will cause approximately equal amounts of cord 17 to be distributed between storage space 13, 15 of device 10. It is not necessary to equally divide cord 17 between storage areas 13, 15. More of cord 17 may be loaded into one side than the other. When such unequal loading of cord is selected, the flexibility of divider 16 accommodates the increased cord bulk on the more fully loaded storage side 13, 15.

As is shown in FIG. 4 cord portion 17a is contained within storage space 13 of half 12 and cord portion 17b is contained within storage space 15 of half 14 with segment 28 passing through void 20 (FIG. 3) such that cord 17 communicates between halves 12, 14. FIG. 4 also shows the separation between cord portions 17a, 17b, including the respective cord ends 18, 19, which is maintained by divider 16. FIGS. 4 and 5 show cord end 18 exiting space 13 of half 12 and cord end 19 exiting space 15 of half 14. This separation between cord portions 17a, 17b eliminates entanglements between the two cord portions as they are wound on and unwound from device 10. As discussed previously, this problem is particularly present in drum-type prior art devices in which two cord segments are wound onto a drum or cylinder simultaneously. In such undivided cord holders the two cord segments frequently become entangled during use and the tangled section is rewound onto the holder. During the next use of the cord the unwinding is brought to a halt until the user untangles the cord. This problem is solved in the present invention due to the separation of cord portions 17a, 17b during winding and unwinding.

The present invention also provides a clamping action or resistance means for retaining the cord on the storage device and for preventing uncoiling of the cord from the device. The biasing or compression of flanges 24, 26 against divider 16, or each other if the divider does not contact flanges 24, 26, is sufficient to restrain the cord and prevent unneeded cord from uncoiled to the outside of reel 10. Also the compression of flanges 24, 26, maintains tension on cord 17 and keeps the cord from loosening within storage areas 13, 15 and becoming tangled within itself. The compression provided by flanges 24, 26 is a result of the curved outer walls 40 of halves 12, 14 pressing toward each other. The inclusion of flanges 24, 26 is not necessary for the functioning of device 10. If flanges 24, 26 are not included in device 10 the edge of outer wall 40 can press against divider 16 or against the opposing outer wall 40 in order to seal the device and provide tension against cord 17. The benefit of flanges 24, 26 is in the greater surface area available with the flanges for sealing the device from the elements and in the stiffness provided by flanges 24, 26 to outer wall 40.

Referring now to FIGS. 6, 7, 8 and 9 the formation of an alternative embodiment of divider 16 is shown which, in general, provides a number of flexible tabs 22a–22h which serve to support divider 16 on joint 33, 35 when halves 12, 14 are assembled. When divider 16 is initially constructed, tabs 22a–22h are flat and co-planar with divider 16 as shown in FIG. 7. Upon assembly, tabs 22a–22h are bent, alternately, to approximately opposing right angles with respect to the plane of divider 16. The bent positions of tabs 22a–22h are shown in FIGS. 8, 9. Tabs 22g, 22e, 22c and 22a are bent toward a first side of divider 16 and tabs 22b, 22d, 22f and 22h are bent toward the second side of divider 16. A side view of the bent tabs is shown in FIG. 9.

The sideward bending of tabs 22a–22h provides flat feet-like protrusions from divider 16 and which are parallel to, and which contact, joints 33, 35 at junction 23 when halves 12, 14 are assembled with divider 16. The tabs, when bent in this fashion, serve to stabilize divider 16 on junction 23 and permit this embodiment of divider 16 to slide laterally on joint 33, 35 between space 13, 15 and thereby provide additional room to the side 12, 14 having a greater amount of cord 17 contained therein.

Figure 10:
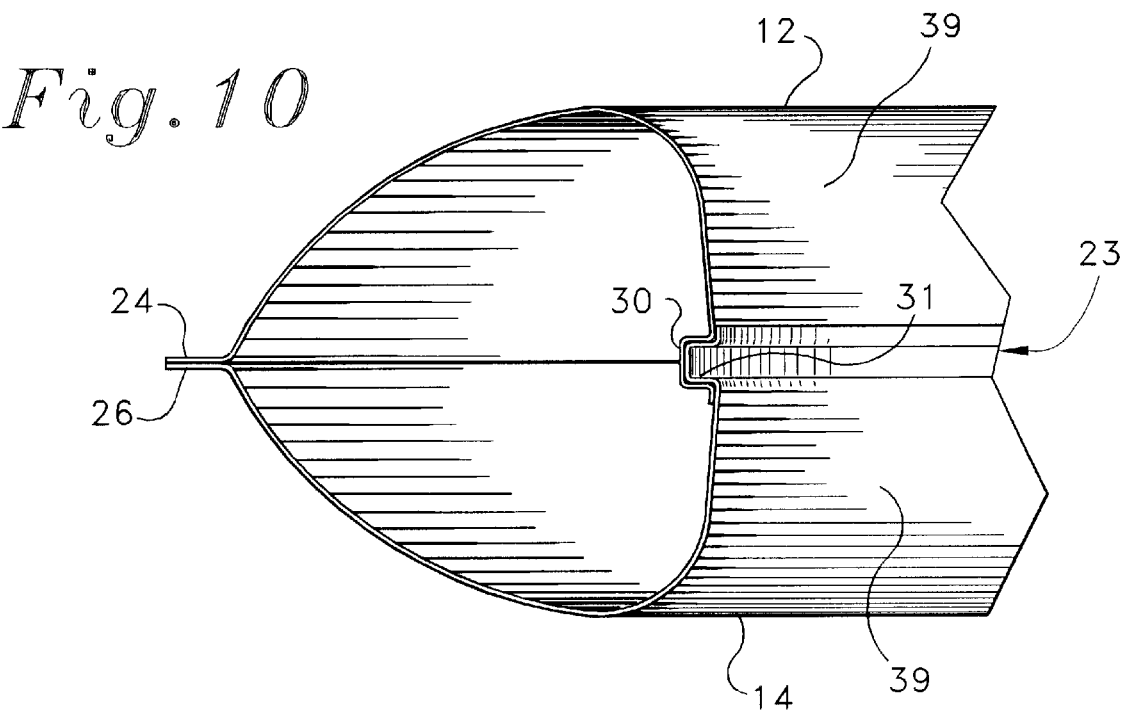
FIG. 10 is a fragmentary cross-sectional view of the device taken along line 10—10 of FIG. 5 with the cord and divider eliminated for clarity and showing an embodiment having registerable grooves for coupling the two halves of the device and showing the flanges of the shell-halves abutting one another.
Figure 11:
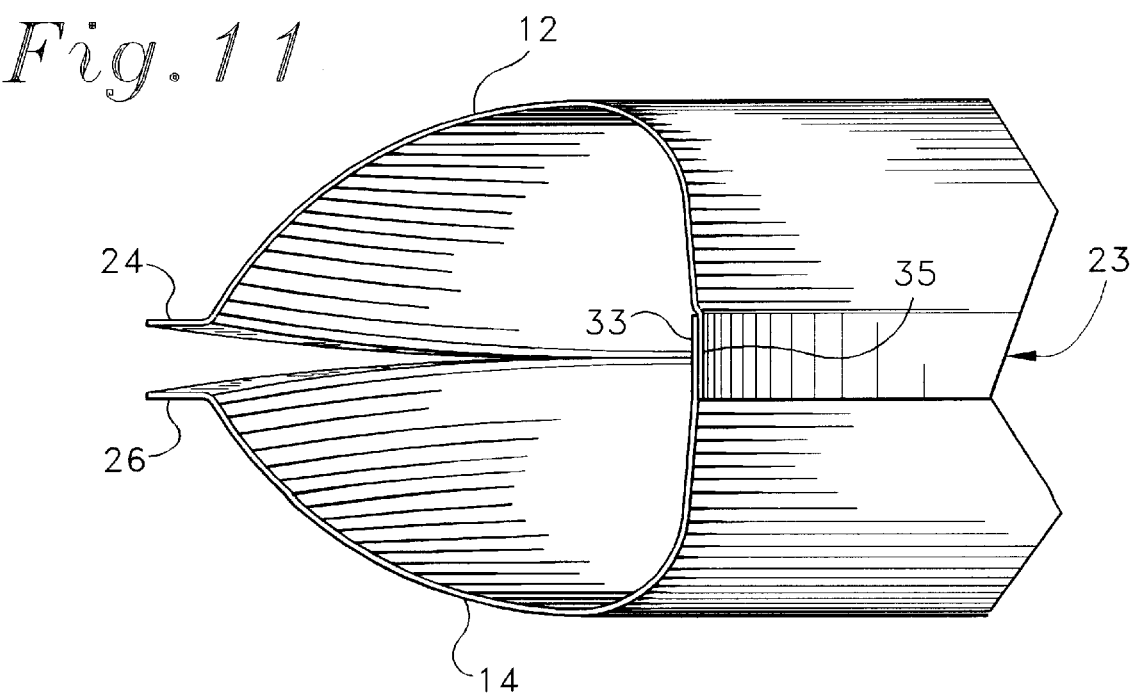
FIG. 11 is a fragmentary cross-sectional view of the device taken along line 11—11 of FIG. 5 with the cord and divider eliminated for clarity and showing a telescoping-type of mating of the inner portions of the two halves of the device and showing the flanges flexed apart to allow access to the interior of the device.

Referring now to FIGS. 10 and 11 alternatives for connecting halves 12, 14 will be discussed. In both FIGS. 10 and 11 the separating divider 16 which maintains the shell storage as two separate areas has been removed for clarity of discussion of FIGS. 10 and 11. It is to be understood that the principle of operation of the present invention is lost by removal of divider 16 and the subsequent creation of a single storage space thereby, and that FIGS. 10 and 11 do not represent an alternate embodiment having no divider 16.

Two embodiments of a joint 23 or junction 23 are shown in FIGS. 10 and 11. In the joint shown in FIG. 10, registerable or mateable grooves 30, 31 are provided on each shell-half 12, 14 which are press-fit together and which catch, one-within-the-other and lock halves 12 and 14 together. It also is shown in FIG. 10 that flanges 24, 26 contact and mate with each other, or are registerable with each other, to exclude dust, dirt and moisture from the interior of the generally annular container. In FIG. 1 is can be seen that flanges 24, 26 contact divider 16, or are registerable with the surface of divider 16 to exclude dirt and moisture from the interior.

In the embodiment of FIG. 11, inner-outer sliding, frictional-fit joints 33, 35 or telescoping frictional-fit joints 33, 35 are provided which hold halves 12, 14 together. This type of joint provides a smooth inner surface which is more compatible the functioning of tabs 22a–22h (FIG. 9) as previously discussed. As shown in FIGS. 10 and 11 flange 24 extends from half 12 and flanges 26 extends from half 14. As shown in FIG. 11 flanges 24, 26 can be spread apart to provide access into each interior storage section 13, 15. Referring to FIG. 1, it may be seen that flanges 24, 26 contact divider 16 when it is in place. However, it is possible for the outer edge of divider 16 to terminate inside of halves 12, 14 and to permit flanges 24, 26 to be in direct contact with one another without detracting from the inventive aspects of the invention.

In another alternative embodiment of storage device 10, the entire device may be formed as a single unit, in which case no joints are present and junction 23 is of unitary construction as a result of the forming such a blow-molding or injection molding. In this case divider 16 may be formed as a part of the whole unit or may be inserted after construction of the shell as a whole single piece.

Figure 12:
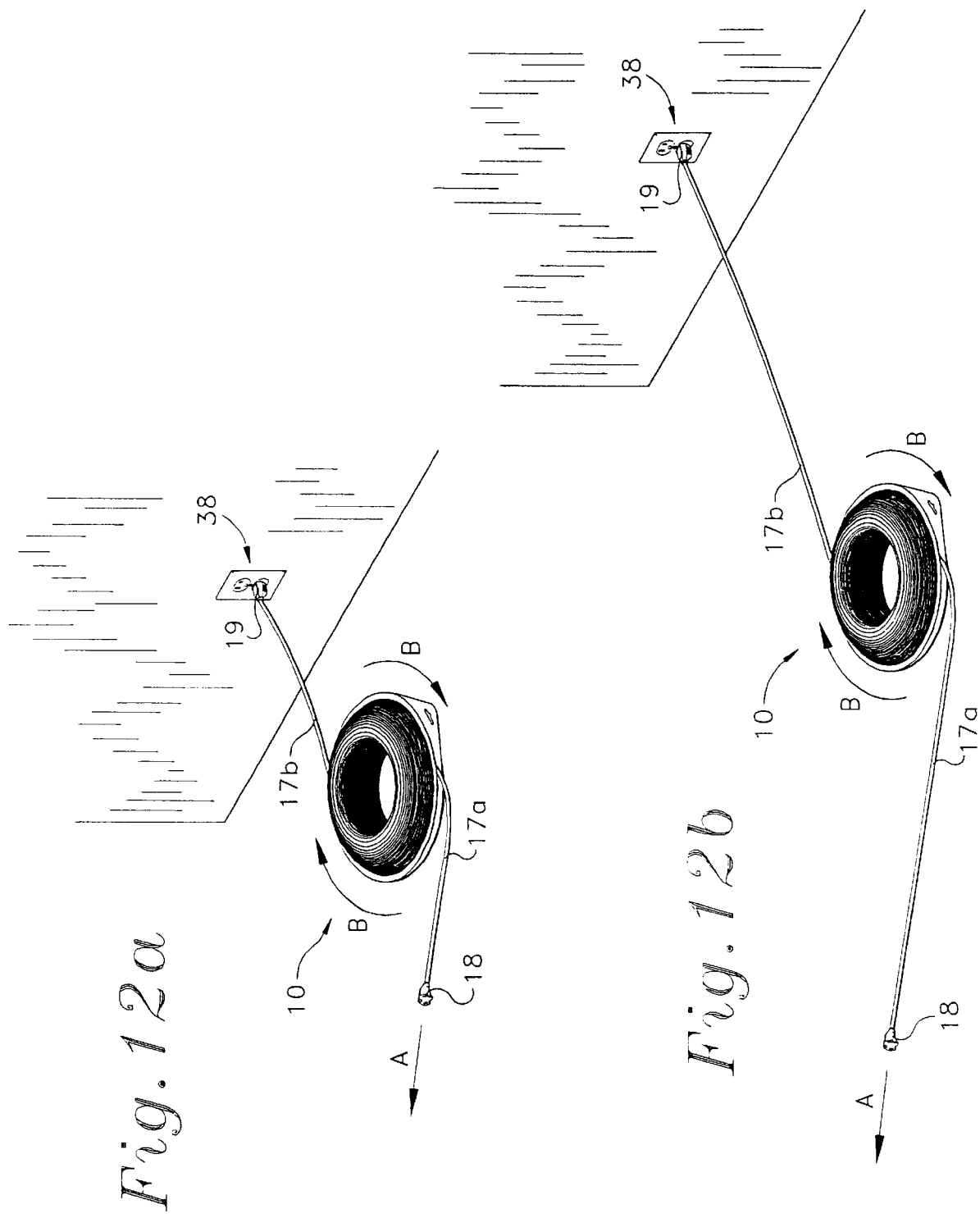
FIG. 12a shows the invention with a cord therein and one end of the cord fixed in place with arrows indicating the rotation of the invention as a pulling force is applied to the free end of the cord.
FIG. 12b shows the device of FIG. 12a after a portion of the cord has been removed from the device after application of pulling force to the free end of the cord.

Referring now to FIGS. 12a and 12b one manner of operation of device 10 is shown. In FIGS. 12a, 12b cord portions 17a, 17b have been wound in the same direction and onto device 10. In FIG. 12a cord portion 17b has been extended to permit cord end 19 to be plugged into a wall electrical receptacle 38. Storage device 10 has been placed on the ground near receptacle 38 for convenience and a user may then pull on cord end 18 in the direction of Arrow A. This user force applied to cord end 18 causes cord portion 17a to be extracted from device 10 and causes rotation of device 10 in the direction of Arrows B and pulls device 10 slightly in the direction of Arrow A. This rotation and traveling movement of device 10, in turn, allows cord portions 17a, 17b to be unwound from device 10 as device 10 rotates and travels in the direction of Arrow A in response to the user pulling on cord end 18. In the method of operation of this example, roughly equal lengths of cord portion 17a and cord portion 17b are extracted from storage space 13, 15 of halves 12, 14 of device 10.

Alternatively, if cord portions 17a, 17b are wound in opposite directions (FIG. 21) during the loading process onto device 10 the user can pay-out a specific amount of cord-portions 17a and 17b and device 10 will prevent additional cord from being unwound even though one or both cord ends are pulled. In this case the opposite winding of the cord-portions serves to prevent rotation of device 10 when one or both cord ends 18, 19 are pulled. This manner of operation is useful when it is desired to limit the available cord such as when the device is used with small appliances of stereo equipment and the like.

Figure 13:
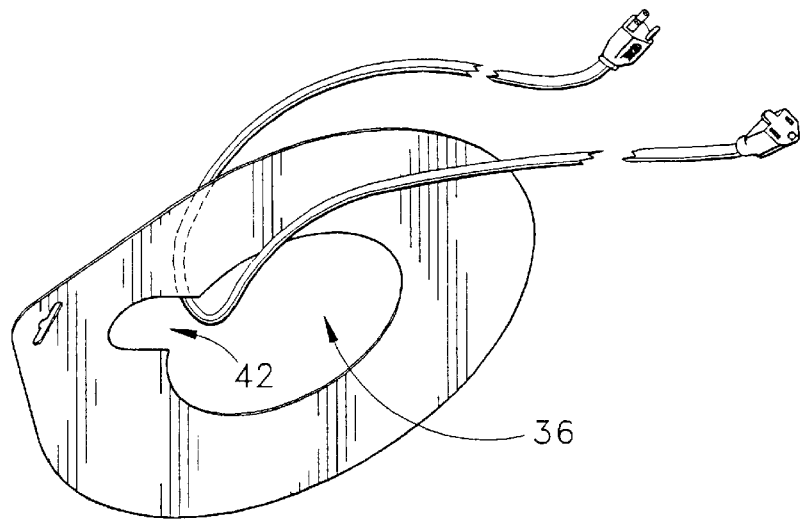
FIG. 13 shows an alternate embodiment of the divider without centering tabs and with an enlarged notch for ease of user installation of a cord in the previously assembled device.
Figure 14:
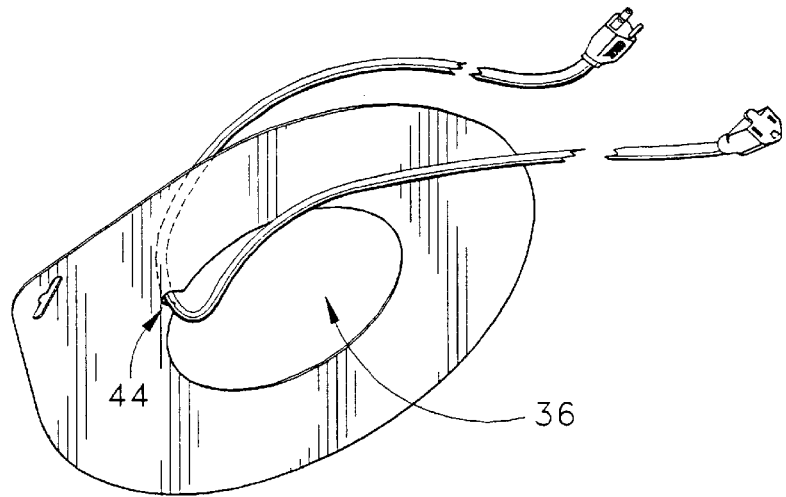
FIG. 14 shows an alternate embodiment of the divider without centering tabs and with a cord-sized notch to permit communication of the cord between the two sides of the divider and to lock the cord within the inventive device.
Figure 15:
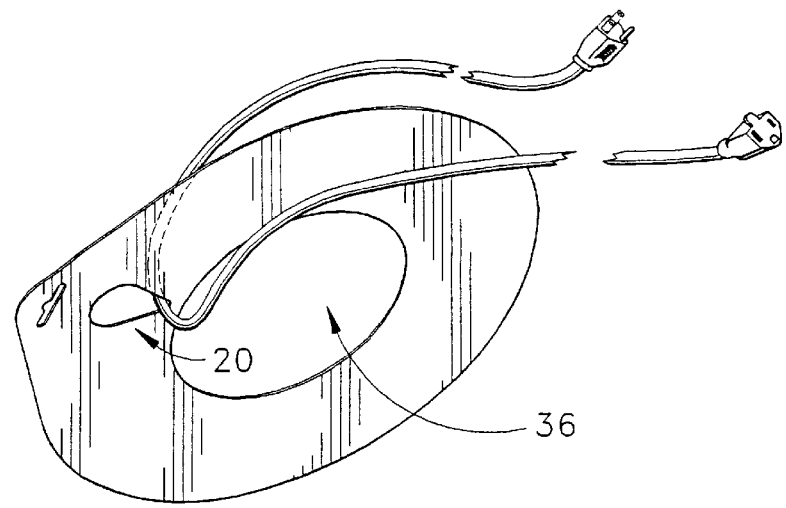
FIG. 15 shows an alternate embodiment of the divider without centering tabs and with a pass-through void in the divider for ease of user installation of a cord.

Referring now to FIGS. 13, 14 and 15, alternative embodiments of divider 16 are shown. In the embodiment of FIG. 13 an embodiment is shown having an enlarged notch or void 42 in divider 16 for passage of cord 17 therethrough. In the embodiment of FIG. 14 an embodiment is shown having an cord-sized notch or void 44 in divider 16 for passage of cord 17 therethrough prior to assembly of halves 12, 14. FIG. 15 shows the void embodiment of FIG. 2. Each of these embodiments of divider 16 may be used with or without tabs 22a–h.

Figure 16:
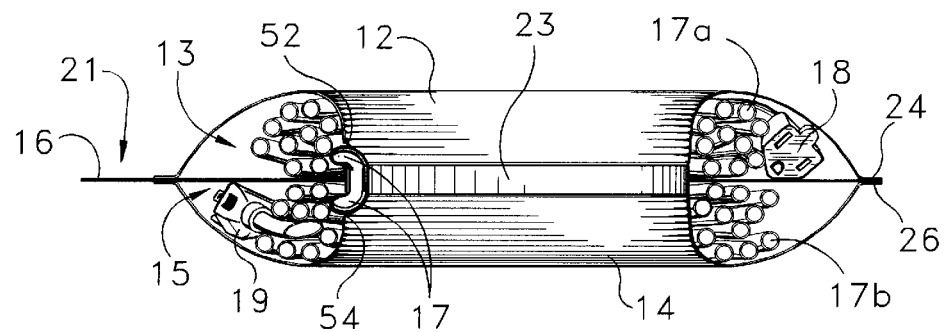
FIG. 16 is a cross-sectional view taken along line 16—16 of FIG. 17 and showing the placement of a cord within the device and the cord ends concealed within the device adjacent the cord and the communication of the cord between storage sections by passage of the cord outside of a first storage section and into the central aperture and into the second storage section.
Figure 17:
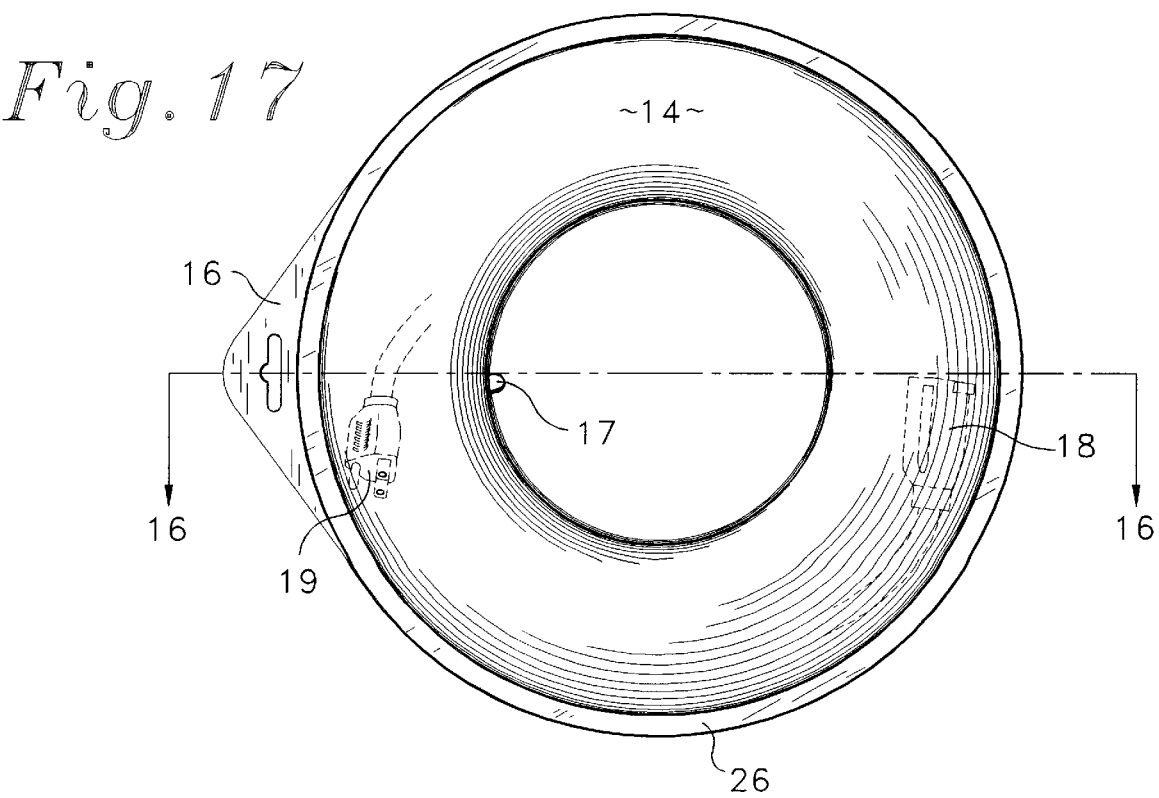
FIG. 17 is a top plan view of the device showing in phantom lines the ends of a cord concealed within the storage areas of the device and the cord passing out of a first storage section and into the central aperture and into the second storage section for communication of the cord between storage sections of the device with the bottom view being a mirror image thereof.

Referring now to FIGS. 16 and 17, it can be appreciated that the cord ends 18, 19 can be inserted inside of the cord storage areas for greater protection of the cord ends and to insure that the cord does not inadvertently unwind by gratuitous tugging on the exposed cord ends. To store the ends for cord 17 within storage areas 13, 15, a user flexes outer wall 40 outwardly and away from divider 16 and pushes cord ends 18, 19 into their respective storage areas 13, 15. Once cord ends 18, 19 are placed within storage areas 13, 15 flanges 24, 26 can fully close against divider 16 to completely seal storage areas 13, 15 from the outside.

Generally, prior art devices do not permit the user to enclose the cord ends and instead leave the ends exposed. This can allow the cord ends to be caught on passing objects and can allow the cord to be unwound and defeat the purpose of the storage device. In addition, the ability of the present invention to allow concealment of the cord ends prevents small children from unwinding the cord and creating a potentially dangerous situation. The present invention to permits full concealment of the cord ends within the storage area, and allows for complete closure of the cord storage device. In this mode of use dust and dirt and moisture can be excluded from the interior of the storage device.

Still referring to FIGS. 16 and 17, an alternative embodiment is shown in which cord 17 communicates between storage areas 13, 15 by extending outside of shell-half 12 through an aperture 52 in shell-half 12 and extending across junction 23 and into shell-half 14 through aperture 54 therein. In this embodiment pass-through void 20 of divider 16 can be eliminated. Apertures 52, 54 in shell-halves 12, 14 can be made sufficiently large to allow cord ends 17a, 17b to be passed through apertures 52, 54.

Referring now to FIG. 21 an alternative method of using device 10 is shown in which cord-portions 17a, 17b are wound onto storage areas 13, 15 in opposite directions from one another. When the cord-portions are wound oppositely the cord 17 cannot be unwound from the device by a user pulling on both cord ends 18, 19. In effect a locking of the cord is provided and no more cord can be released from the device without the user intentionally unwinding cord from one side or the other.

In operation, a user unwinds a desired or selected amount X (FIG. 21) of cord from device 10 by separately unwinding cord from one or both storage areas 13, 15 (FIG. 16). This provides the user with a specific amount of unwound cord which cannot be changed by a child or small animal pulling on cord 17 or device 10. In this method of use the user can reposition the location of device 10 along the selected length X of cord 17 by simply holding one cord end 18, 19 and pushing device 10 away from the held end and toward an alternate location. As device 10 travels along length X some cord is wound-onto one side of device 10 and an equal amount of cord is wound-off the opposite side of device 10, but the amount of exposed cord X remains constant and device 10 can be repositioned anywhere along cord length X while maintaining the same length of user selected cord.

Specifically referring to FIG. 21, a user unwinds a cord length X for use. Upon exposing cord length X, the user will be confronted with device 10 at a first location A. The user can then reposition device 10 to an alternate position B or C by grasping cord end 19 and pushing device 10 from position A to position B or onto position C. If the user wishes to reposition device 10 toward cord end 19, this can be accomplished by grasping cord end 18 and pushing device 10 from position A to position D. This relocation of device 10 does not change the length X of cord 17 initially exposed by the user. This method of use of device 10 is convenient for the storage of appliance and television and audio equipment cords wherein a specific length of cord is desired and the user wishes to locate device 10, holding the remainder of the cord, to a camouflaged location along cord length X.

In the foregoing description, certain terms have been used for brevity, clearness and understanding; but no unnecessary limitations are to be implied therefrom beyond the requirements of the prior art, because such terms are used for descriptive purposes and are intended to be broadly construed and are considered to include all equivalents of the described structure and features. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

It is also to be understood that the following claims are intended to cover all of the generic and specific features of the invention herein described, and all statements of the scope of the invention which, as a matter of language, might be said to fall therebetween.

Having now described the features, discoveries and principles of the invention, the manner in which the improved cord reel and storage device is constructed and used, the characteristics of the construction, and advantageous, new and useful results obtained; the new and useful structures, devices, elements, arrangements, parts and combinations, are set forth in the appended claims.

Having thus described the invention what is claimed as new and desired to be secured by Letters Patent is as follows:

1. A cord winding and storage apparatus comprising:
   a generally annular-shaped container comprising a hollow interior and an inner wall and a flexible outer wall,
   a continuous circumferential openable slit in said outer wall of said container to provide access to said container interior and to allow user insertion of the cord upon flexing said outer wall to open said slit to access said interior,
   a divider within said hollow interior extending, generally, from said inner wall and terminating proximate to said circumferential openable slit for partitioning said interior into a first storage half and a second storage half, and
   a void in said divider to permit cord communication between said first and second halves for windable cord storage about said container inner wall of a first cord-portion in said first half and for windable storage about said container inner wall of a second cord-portion in said second half to accomplish separated cord-portion storage to allow both independent as well as simultaneous winding and unwinding of said first and second cord-portions.

2. The device as claimed in claim 1 wherein said divider is a generally flat disk having a central void therein for passage of said inner wall therethrough and a plurality of tabs extending about the perimeter of said central void, said tabs being oriented at right angles to said disk to assist the centering of said disk between said first and second halves.

3. The device as claimed in claim 1 wherein said divider is substantially non-rotatable about said inner wall.

4. The device as claimed in claim 1 further comprising a flat flange extending outwardly from the outer wall of each of said first and second halves, said flat flange of said first half being registerable and biased against said flange of said second half to exclude dirt and moisture from the hollow interior of said container and to retain the cord in a selected position.

5. The device as claimed in claim 4 wherein said flanges contact and are biased against said divider to exclude dust and moisture from the interior of said first and second halves and to retain the cord in a selected position.

6. The device as claimed in claim 1 wherein said generally annular-shaped container comprises a first half-annulus shell for registerable joining to a second half-annulus shell, said joined shell halves providing said hollow interior for storage of the cord therein.

7. The device as claimed in claim 6 wherein said first and second halves are provided with registerable telescope-joint interior walls for connecting said halves.

8. The device as claimed in claim 6 wherein said first and second halves are provided with registerable grooves on said interior walls of said first and second halves for interconnecting said halves.

9. A cord winding and storage apparatus comprising:
   a generally annular-shaped container comprising a hollow interior and an inner wall and a flexible outer wall,
   a continuous circumferential openable slit in said outer wall of said container to provide access to said container interior and to allow user insertion of the cord upon flexing said outer wall to open said slit to access said interior,
   a divider within said hollow interior extending, generally, from said inner wall and terminating proximate to said circumferential openable slit for partitioning said interior into a first storage half and a second storage half,
   a first void in said first half inner wall, and
   a second void in said second half inner wall, said first and second voids permitting passage of the cord between said first and second halves for windable storage about said container inner wall of a first cord-portion within said first half and for windable storage about said container inner wall of a second cord-portion within said second half to accomplish separated cord-portion storage to allow both independent as well as simultaneous winding and unwinding of said first and second cord-portions.

10. The device as claimed in claim 9 wherein said divider is a generally flat disk having a central void therein for passage of said inner wall therethrough and a plurality of tabs extending about the perimeter of said central void, said tabs being oriented at right angles to said disk to assist the centering of said disk between said first and second halves.

11. The device as claimed in claim 9 wherein said divider is substantially non-rotatable about said inner wall.

12. The device as claimed in claim 9 further comprising a flat flange extending outwardly from the outer wall of each of said first and second halves, said flat flange of said first half being registerable with and biased against said flange of said second half to exclude dirt and moisture from the hollow interior of said container and to retain the cord in a selected position.

13. The device as claimed in claim 12 wherein said flanges contact and are biased against said divider to exclude dust and moisture from the interior of said first and second halves and to retain the cord in a selected position.

14. The device as claimed in claim 9 wherein said generally annular-shaped container comprises a first half-annulus shell for registerable joining to a second half-annulus shell, said joined shell halves providing said hollow interior for storage of the cord therein.

15. The device as claimed in claim 14 wherein said first and second halves are provided with registerable telescope-joint interior walls for connecting said halves.

16. The device as claimed in claim 14 wherein said first and second halves are provided with registerable grooves on said interior walls of said first and second halves for interconnecting said halves.

17. An apparatus for winding and storage of a cord therein comprising:
   a generally donut-shaped shell comprising a first shell-half for joining to a second shell-half, said joined shell-halves defining a hollow interior for storage of the cord and presenting an inner wall and a flexible outer wall,
   a continuous circumferential openable slit in said outer wall of said donut-shaped shell to provide access to said hollow interior and to allow user insertion of the cord upon flexing said outer wall to open said slit to access said interior,
   a divider within said shell to maintain separation between said first shell-half hollow interior and a second shell-half hollow interior, said divider extending from said inner wall of said donut-shaped shell toward said outer wall of said shell, and
   a means for cord communication between said first hollow interior and said second hollow interior for windable storage about said inner wall of a first cord-portion within said first half interior and for windable storage about said inner wall of a second cord-portion within said second half interior to accomplish separated cord-portion storage to allow both independent as well as simultaneous winding and unwinding of said first and second cord-portions.

18. The device as claimed in claim 17 further comprising opposed flat flanges extending from the outer perimeter of each of said halves to exclude dust and moisture from the interior of said first and second halves and to provide cord restraining pressure against the cord to hold the cord in position.

19. The device as claimed in claim 17 wherein said first and second halves are joined by registerable grooves on said interior wall of said first and second halves for interconnecting said halves.

20. The device as claimed in claim 17 wherein said first and second halves are joined by registerable telescoping interior walls on said first and second halves for connecting said halves.

21. The device as claimed in claim 17 wherein said means for cord communication is a void in said divider.

22. The device as claimed in claim 17 wherein said means for cord communication is a first void in said first half inner wall and a second void in said second half inner wall.

23. The device as claimed in claim 17 wherein said divider is substantially non-rotatable about said inner wall.

* * * * *